United States Patent
Tsuchitoi

(10) Patent No.: US 9,576,132 B2
(45) Date of Patent: Feb. 21, 2017

(54) INFORMATION PROCESSING APPARATUS AND INFORMATION PROCESSING METHOD

(71) Applicant: CANON KABUSHIKI KAISHA, Tokyo (JP)

(72) Inventor: Naoki Tsuchitoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/615,861

(22) Filed: Feb. 6, 2015

(65) Prior Publication Data
US 2015/0235028 A1 Aug. 20, 2015

(30) Foreign Application Priority Data

Feb. 19, 2014 (JP) .................................. 2014-029967

(51) Int. Cl.
*H04L 29/06* (2006.01)
*G06F 21/57* (2013.01)

(52) U.S. Cl.
CPC .................................. *G06F 21/572* (2013.01)

(58) Field of Classification Search
CPC ..... G06F 17/30097; G11C 7/00; H04L 41/024
See application file for complete search history.

(56) References Cited

U.S. PATENT DOCUMENTS

2010/0062844 A1* 3/2010 Crowder, Jr. ........... G06F 21/57
463/29

FOREIGN PATENT DOCUMENTS

JP 2004-206394 A 7/2004

* cited by examiner

*Primary Examiner* — Joseph P Hirl
*Assistant Examiner* — Leynna Truvan
(74) *Attorney, Agent, or Firm* — Fitzpatrick, Cella, Harper & Scinto

(57) ABSTRACT

The hash value for an entire system file partition for storing firmware of an information processing apparatus is calculated. Alteration of the firmware is detected based on the hash value.

7 Claims, 11 Drawing Sheets

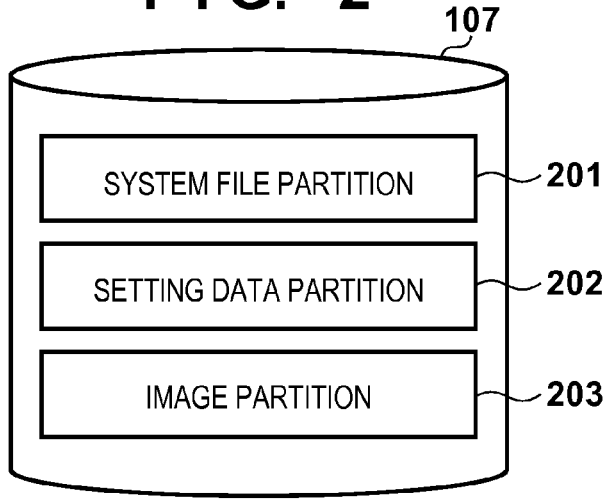
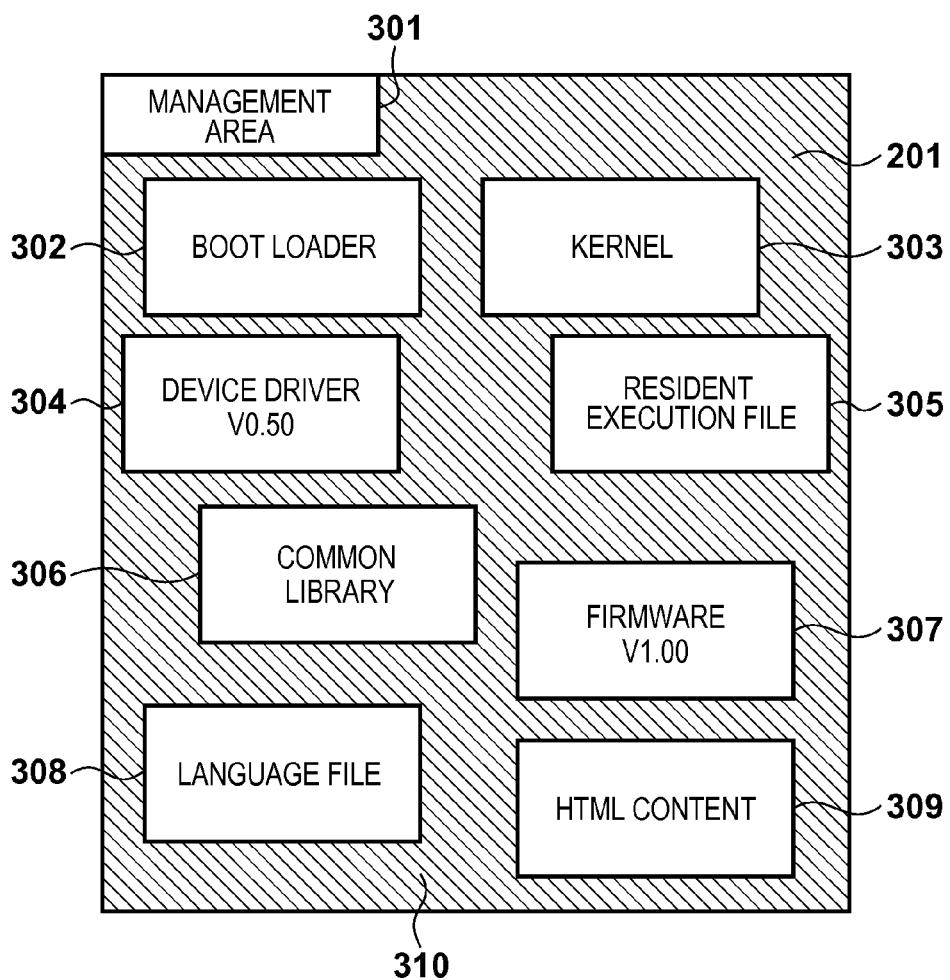

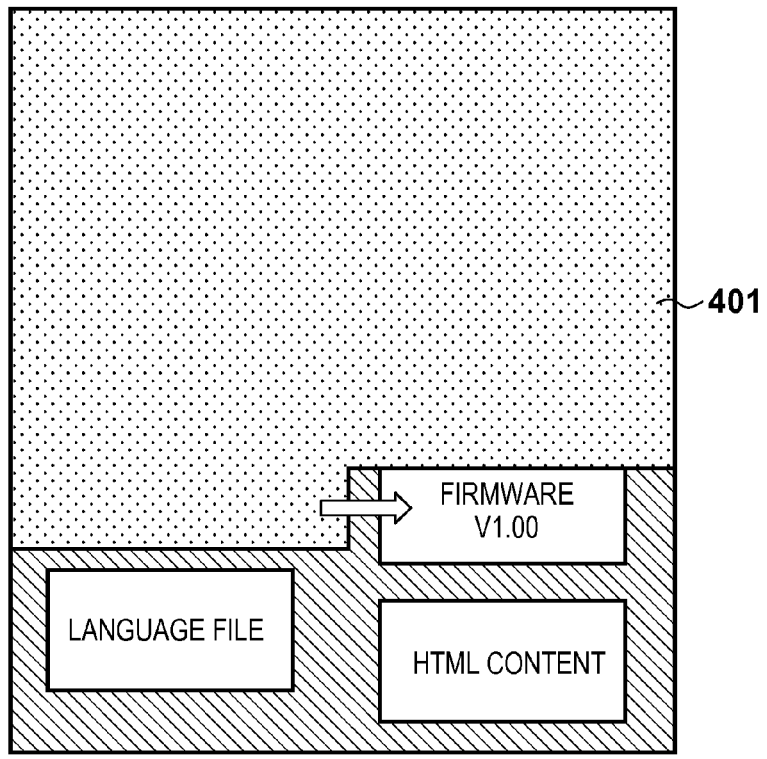
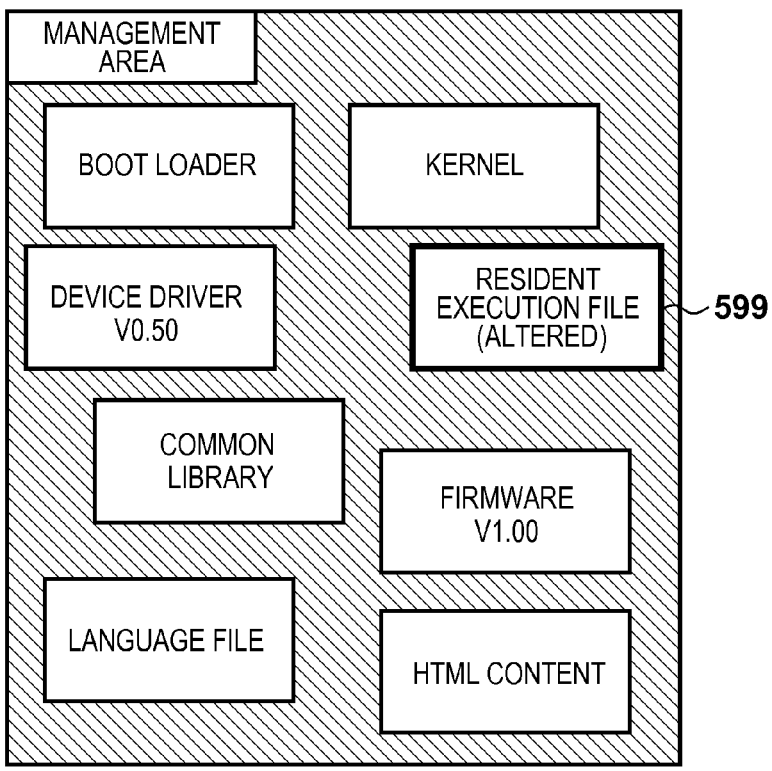

INFORMATION PROCESSING APPARATUS AND INFORMATION PROCESSING METHOD

BACKGROUND OF THE INVENTION

Field of the Invention

The present invention relates to an alteration presence/absence detection technique.

Description of the Related Art

Recent multi function peripherals (MFPs) have a network interface, and functions equivalent to those of a PC or server, such as a file server function and mail transmission/reception function. Under these circumstances, unauthorized use of a device by illegal hacking is regarded as a problem for the multi function peripherals, similarly to PCs and servers.

Many of embedded information processing apparatuses such as multi function peripherals assume the use of only firmware assumed upon shipping. A white list system is common, which allows the use of only correct firmware by saving in advance verification data of each file of usable firmware, and performing alteration verification for the firmware using the verification data to use the firmware. To confirm the uniqueness of the firmware, it is common practice to use, as verification data, a hash value generated using a hash function based on binary data of each file storing the firmware. The hash function is also called a unidirectional function. When a hash value is generated from a given value using the hash function, it is impossible to alter the original value without changing the hash value, and thus the hash value can be used for alteration verification of determining whether the firmware is correct. Alteration confirmation indicates an operation of calculating a hash value for the entire file when executing the firmware or opening the file, confirming whether the calculated hash value coincides with verification data for the file saved in a white list, determining, if the hash value does not coincide with the verification data, that alteration has been performed, and giving the user a warning or the like.

Since firmware is generally formed from a plurality of files, verification data, the number of which is equal to that of files, are saved. Software for performing alteration verification by the white list system is widely used, and some products such as Tripwire are available.

To prevent firmware from being altered, there is proposed a method of copying data of a disk to a RAM instead of a nonvolatile disk, and mounting the RAM as a disk (Japanese Patent Laid-Open No. 2004-206394).

Problems with the conventional white list system are as follows.

First, it is necessary to save verification data for each of an enormous number of software programs in a device. In this case, if the capacity of the nonvolatile memory of the device is limited, it becomes necessary to increase the capacity of the nonvolatile memory, thereby increasing the device cost.

Second, if alteration verification is performed for an enormous number of software programs, the overhead of loading of each file and hash calculation increases to put a heavy operation load on the device, thereby degrading the operation performance.

SUMMARY OF THE INVENTION

The present invention has been made in consideration of the above problems, and provides a technique of implementing alteration verification for a large number of system files without using a large memory area and increasing the processing load.

According to the first aspect of the present invention, there is provided an information processing apparatus comprising: a storage unit having a system file partition used to store firmware of the information processing apparatus; a calculation unit configured to calculate a hash value for the entire system file partition; and an alteration detection unit configured to detect alteration of the firmware based on the hash value.

According to the second aspect of the present invention, there is provided an information processing method for an information processing apparatus, comprising: a calculation step of calculating a hash value for an entire system file partition, being provided in a storage unit of the information processing apparatus, used to store firmware of the information processing apparatus; and an alteration detection step of detecting alteration of the firmware based on the hash value.

Further features of the present invention will become apparent from the following description of exemplary embodiments (with reference to the attached drawings).

BRIEF DESCRIPTION OF THE DRAWINGS

FIG. 2 is a view showing an example of the arrangement of a storage area (memory area) in a storage device 107;

FIG. 3A is a view showing an example of the arrangement of system files in a system file partition 201;

FIG. 3B is a view for explaining hash value calculation processing;

FIG. 4A is a view showing an example of alteration in the system file partition 201;

DESCRIPTION OF THE EMBODIMENTS

Embodiments of the present invention will be described below with reference to the accompanying drawings. Note that the embodiments to be described below are merely examples when the present invention is practiced concretely, and are practical embodiments of arrangements described in the appended claims.

First Embodiment

By exemplifying a system including a PC (Personal Computer) and a multi function peripheral (MFP) as an information processing apparatus according to this embodiment, processing for determining the presence/absence of alteration in a memory area holding system files, which is executed by the multi function peripheral, will be described below.

Figure 1:
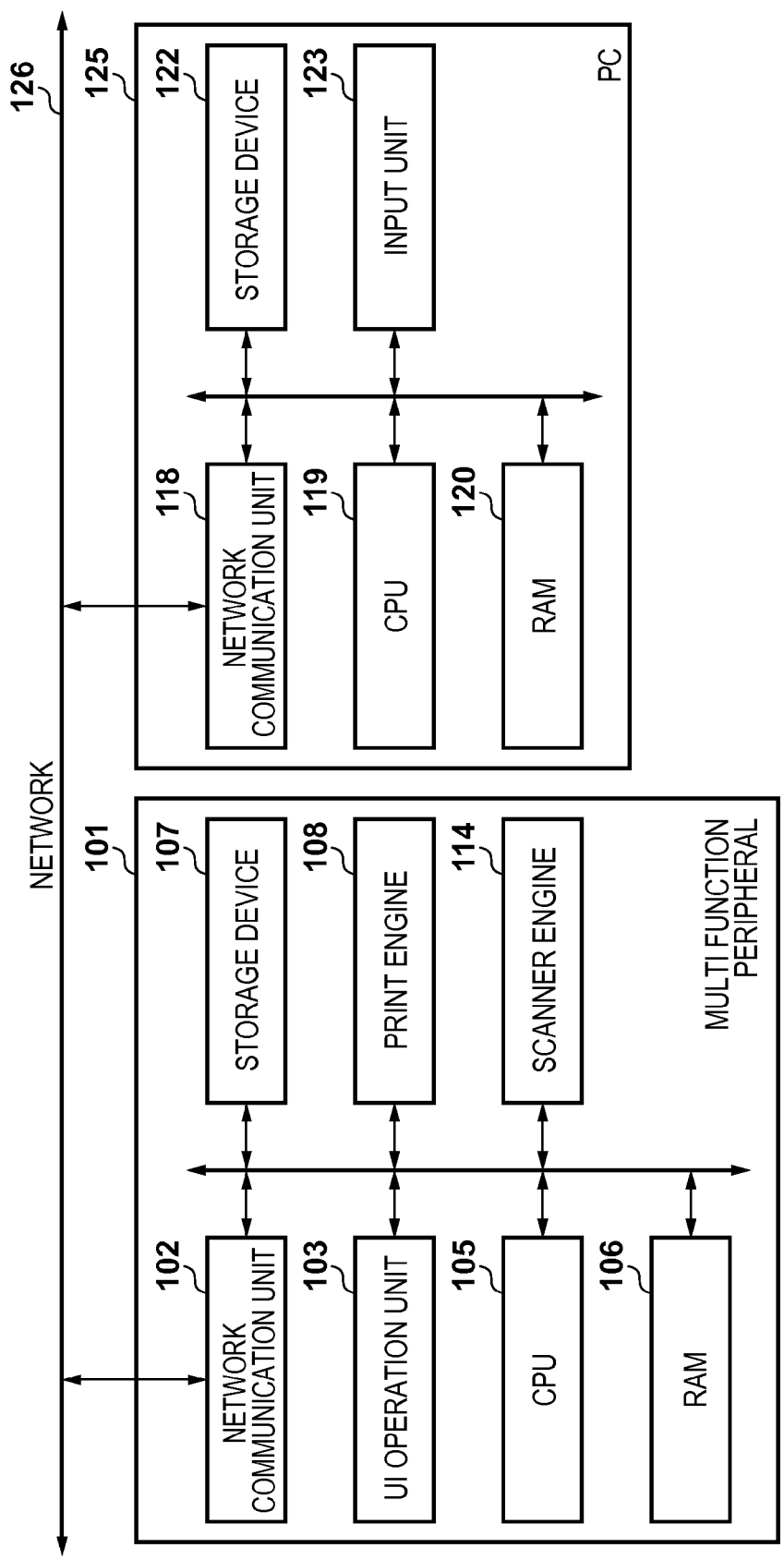
FIG. 1 is a block diagram showing an example of the arrangement of a system.

An example of the arrangement of a system according to this embodiment will be explained with reference to a block diagram shown in FIG. 1. As shown in FIG. 1, the system according to this embodiment includes a multi function peripheral 101 and a PC 125, and the multi function peripheral 101 and the PC 125 can communicate with each other via a network 126. The network 126 is a well-known network such as a LAN or the Internet, and may be a wired or wireless network.

The PC 125 will be described first. The PC 125 can generate a print target such as a document or image, and transmit it to the multi function peripheral 101, thereby causing the multi function peripheral 101 to print the print target. An instruction issued by the PC 125 to the multi function peripheral 101 is not limited to a print instruction, and various instructions such as a scan instruction and data storage instruction may be issued.

A CPU 119 controls the overall operation of the PC 125 by executing processing using computer programs and data stored in a RAM 120, and executes each process to be described later as a process performed by the PC 125.

The RAM 120 has an area for temporarily storing computer programs and data loaded from a storage device 122, and various data received from the multi function peripheral 101 via a network communication unit 118. Furthermore, the RAM 120 has a work area which is used by the CPU 119 to execute various processes. That is, the RAM 120 can provide various areas, as needed.

The storage device 122 is a mass information storage device represented by a hard disk drive device. The storage device 122 stores an OS (Operating System), and computer programs and data for causing the CPU 119 to execute each process to be described later as a process performed by the PC 125. The computer programs and data stored in the storage device 122 are loaded to the RAM 120 as needed under the control of the CPU 119 to be processed by the CPU 119.

An input unit 123 includes a keyboard and mouse. The operator of the PC 125 can input various instructions to the CPU 119 by operating the input unit 123.

The network communication unit 118 is used to connect the PC 125 to the network 126. The PC 125 can perform, via the network communication unit 118, data communication with the multi function peripheral 101 connected to the network 126.

The multi function peripheral 101 will be explained next.

A CPU 105 controls the overall operation of the multi function peripheral 101 by executing processing using computer programs and data stored in a RAM 106, and executes each process to be described later as a process performed by the multi function peripheral 101.

The RAM 106 has an area for temporarily storing computer programs and data loaded from a storage device 107, and various data received from the PC 125 via a network communication unit 102. Furthermore, the RAM 106 has a work area which is used by the CPU 105 to execute various processes. That is, the RAM 106 can provide various areas as needed.

The storage device 107 is a mass information storage device represented by a hard disk drive device. The storage device 107 stores an OS (Operating System), and computer programs and data for causing the CPU 105 to execute each process to be described later as a process performed by the multi function peripheral 101. The computer programs and data stored in the storage device 107 are loaded to the RAM 106 as needed under the control of the CPU 105 to be processed by the CPU 105.

A print engine 108 performs printing on a print medium such as a paper sheet using print data transmitted from the PC 125, image data output from a scanner engine 114, or the like.

The scanner engine 114 reads information such as images and characters printed on a print medium such as a paper sheet, and outputs the reading result as image data.

A UI (User Interface) operation unit 103 includes a touch panel screen and hard keys, is operated by the operator to input various instructions to the CPU 105, and is also used to display the processing result of the CPU 105 using images and characters.

The network communication unit 102 is used to connect the multi function peripheral 101 to the network 126. The multi function peripheral 101 can perform, via the network communication unit 102, data communication with the PC 125 connected to the network 126.

Note that the arrangement, shown in FIG. 1, of the PC 125 and the multi function peripheral 101 is merely an example, and the present invention is not limited to this. FIG. 1 shows one PC 125 and one multi function peripheral 101 for the sake of simplicity. Two or more PCs and two or more multi function peripherals may be provided.

An example of the arrangement of a storage area (memory area) in the storage device 107 will be described with reference to FIG. 2. The storage device 107 generally includes one storage device (hard disk drive or the like). However, the storage area of the storage device 107 can be divided into logical units (partitions). In the example of FIG. 2, the storage area of the storage device 107 is divided into three partitions (a system file partition 201, a setting data partition 202, and an image partition 203).

The system file partition 201 is a partition for storing permanent files which are not changed in normal use, such as the system files of the multi function peripheral 101, for example, computer programs and data files associated with the basic operation of the multi function peripheral 101.

The setting data partition 202 is a partition used to store various setting data of the multi function peripheral 101, and to temporarily store files.

The image partition 203 is a partition for temporarily storing print data received by the multi function peripheral 101 from the PC 125 via the network communication unit 102, image data output from the scanner engine 114, and the like.

As described above, the system files stored in the system file partition 201 cannot be changed in normal use (except for software update), and can thus be assumed to always contain the same contents. On the other hand, the setting data partition 202 or the image partition 203 is always rewritten when the user changes the settings, or performs a print or scan operation.

Note that the partition division example of the storage device 107 is not limited to this, and the storage area may be divided into four or more partitions. However, assume that a storage area corresponding to the system file partition 201 is provided.

An example of the functional arrangement of the multi function peripheral 101 will be described with reference to a block diagram shown in FIG. 5.

An FS (File System) access unit 501 accesses the system file partition 201.

A hash calculation unit 502 calculates the hash value of given data (having a fixed size unique to the data, for example, 32 bytes) according to a known hash calculation algorithm (for example, SHA-256). The hash calculation algorithm has unidirectionality with which output data is readily generated from input data and it is logically difficult to generate different input data to output the same output data.

An encryption processing unit 503 generates encrypted data by encrypting given data according to a known encryption algorithm (for example, AES). Note that an "encryption key unique to the multi function peripheral 101" to be used for the encryption processing is stored in advance in the system file partition 201 or the like, and cannot be externally read. Note that the encryption processing unit 503 can decrypt given encrypted data.

A verification data save unit 504 registers, in the setting data partition 202, data (a correct hash value for the system file partition 201) to be used to verify the presence/absence of alteration in the system file partition 201.

A software update unit 505 is used to update software stored in the system file partition 201, and actually updates software when, for example, a malfunction or vulnerability is detected.

An alteration confirmation unit 506 performs processing for verifying the presence/absence of alteration in the system file partition 201 (for example, alteration or deletion of software in the system file partition 201 or introduction of invalid software) (processing for alteration detection).

Figure 5:
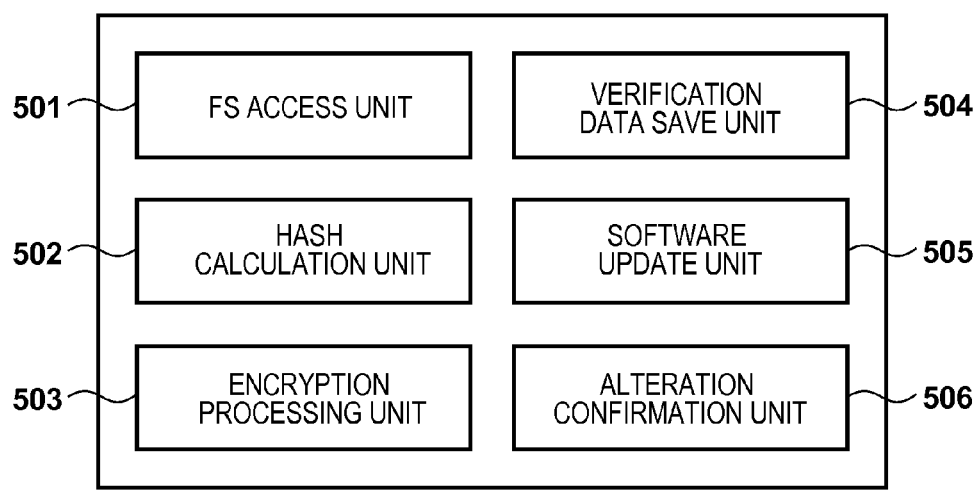
FIG. 5 is a block diagram showing an example of the functional arrangement of a multi function peripheral 101.

Each functional unit shown in FIG. 5 is implemented as a computer program, and stored as a system file in the system file partition 201. Each functional unit shown in FIG. 5 may be described as the main body of processing for descriptive convenience. In fact, the processing is performed when the CPU 105 executes a computer program corresponding to the functional unit.

An example of the arrangement of the system files (except for a management area 301) in the system file partition 201 shown in FIG. 2 will be described with reference to FIG. 3A. The management area 301 is an area used to manage the arrangement of the system files in the system file partition 201. A boot loader 302 decides a program to be started upon activation. A kernel 303 is the nucleus of the OS. A device driver 304 is a device driver for operating the network communication unit 102 or the UI operation unit 103. A resident execution file 305 is a resident execution file which operates separately from firmware 307. A common library 306 is a separated common library referred to and executed from the firmware 307. The firmware 307 causes the multi function peripheral 101 to perform various operations. A language file 308 is a language file separated from the firmware 307 so that the multi function peripheral 101 supports many languages. An HTML content 309 is used when the multi function peripheral 101 is referred to from the outside using HTTP.

A hatched area 310 indicates an unused area (an area where no system file is arranged) of the system file partition 201. Data having a predetermined value is registered in the area 310.

Note that FIG. 3A shows one system file for each kind of system file for the sake of simplicity. A plurality of system files actually exist. For example, a plurality of device drivers exist in correspondence with connected devices.

The system files need not be systematically arranged in the system file partition 201. As shown in FIG. 3A, the individual system files are actually, discretely arranged. The management area 301 manages the physical arrangement of the system files, and the firmware 307 need not manage the physical arrangement. This indicates that the arrangement of the respective system files stored in the storage device 107 need not be the same for the firmware arrangements of the same version or the same products.

Figure 6:
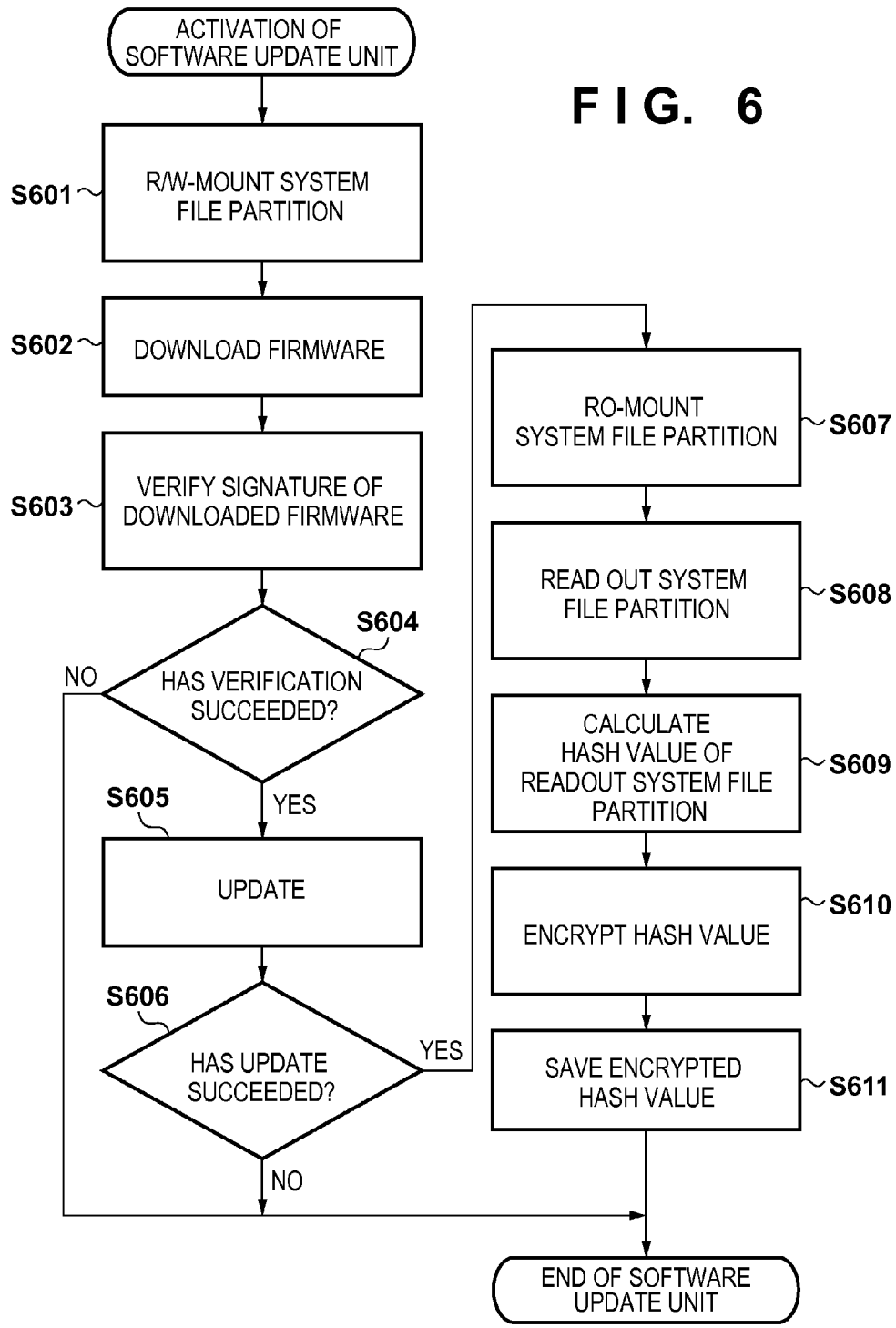
FIG. 6 is a flowchart illustrating processing executed by the multi function peripheral 101.

Processing performed by the multi function peripheral 101 to generate data to be used for verifying the presence/absence of alteration in the system file partition 201 will be described with reference to FIG. 6 which is a flowchart illustrating the processing. Note that the processing according to the flowchart shown in FIG. 6 is executed when the multi function peripheral 101 is activated for the first time or every time the system file in the system file partition 201 is updated. For example, when the CPU 105 detects that the user has instructed to update software by operating the UI operation unit 103, and the update of the system file in the system file partition 201 has been completed, the CPU 105 executes the processing according to the flowchart shown in FIG. 6.

In step S601, the CPU 105 R/W (Read/Write)-mounts the system file partition 201. An R/W mount is a procedure of allowing data to be read/written from/in the system file partition 201. Since only a read operation is generally performed, an RO (Read Only) mount is performed. Only when the system file is updated, however, it is necessary to perform a write operation, and thus an R/W mount is performed.

In step S602, the CPU 105 receives a system file (for example, firmware) transmitted from an external device (for example, the PC 125) via the network communication unit 102, and temporarily stores the system file in the setting data partition 202 of the storage device 107.

In step S602, for example, the CPU 105 connects to an update server which holds an update file, downloads system software, and temporarily copies the downloaded system software to the setting data partition 202. The update server is, for example, a server provided by a manufacturer on the Internet. System software may be downloaded from a portable device such as a USB memory instead of the update server. That is, in step S602, any download sources and any download methods may be used as long as it is possible to download the system file, and store it in the setting data partition 202.

In step S603, the CPU 105 verifies the signature of the system file stored in the setting data partition 202 in step S602. That is, this is a mechanism of adding, to the system file, signature data signed using the private key of the manufacturer, performing verification using a certificate embedded in the multi function peripheral 101, and then verifying whether the system file is a normal system file, thereby confirming whether illegal alteration has been performed in a transfer path.

If verification has succeeded, the process advances to step S605 via step S604; otherwise, the processing according to the flowchart shown in FIG. 6 is completed via step S604.

In step S605, the CPU 105 updates the system file in the system file partition 201. In this case, the update corresponds to an operation of moving the system file stored in the setting data partition 202 in step S602 to a predetermined position in the system file partition 201.

In step S606, the CPU 105 determines whether the update has succeeded in step S605. If it is determined that the update has succeeded, the process advances to step S607; otherwise, the processing according to the flowchart shown in FIG. 6 is completed.

In step S607, the CPU 105 RO (Read Only)-mounts (remounts) the system file partition 201. Processing of rewriting the system file partition 201 is completed at this time. After that, the system file partition 201 is not generally rewritten until update is performed next.

In step S608, the CPU 105 reads out all the data stored in the system file partition 201. In step S609, the CPU 105 calculates one hash value (the hash value of the data) using the data read out in step S608.

In step S609, for example, a hash value is calculated using the SHA-256 hash calculation algorithm. With this algorithm, a 32-byte hash value is generated for input data of an arbitrary size. The hash calculation algorithm has unidirectionality with which output data is readily generated from input data and it is logically difficult to calculate different input data to output the same output data. By using this feature, it is possible to verify the presence/absence of alteration by verifying a hash value since it is practically impossible to derive, from the result of performing illegal alteration, the same value as the hash value generated from the normal system file partition 201.

The processing of calculating one hash value (the hash value of the data) using all the data stored in the system file partition 201 will be described with reference to FIG. 3B. FIG. 3B shows a case in which the stored data are read out in the raster scan order from the upper left corner position of the system file partition 201 shown in FIG. 3A. Reference numeral 401 denotes an area of the already readout data. A corresponding one hash value is calculated using the thus readout data in the system file partition 201. Note that data stored in the unused area (the area where no system file is arranged) of the system file partition 201 are also read out in addition to the data of the system files, and all the readout data are used to calculate a hash value. That is, the calculated hash value reflects not only the data of the system files but also the data stored in the unused area. Therefore, as for not only the system files but also the unused area, if alteration has been performed, the hash value changes. The hash value is a value uniquely generated by the data arrangement of the system file partition 201. If at least one bit of all the data in the system file partition 201 is changed, a completely different hash value is calculated. It is thus possible to detect alteration or deletion of an arbitrary program, or addition of a file for performing an illegal operation.

An example of alteration of the system file partition 201 by altering a given system file in the system file partition 201 will be described with reference to FIG. 4A. Referring to FIG. 4A, the resident execution file 305 is altered, resulting in an altered resident execution file 599. If the resident execution file 305 is altered to be the altered resident execution file 599, a program size is changed and the program is rewritten. This rewrites the entire system file partition 201, resulting in a change in hash value. Therefore, the hash value of the system file partition 201 after alteration is different from that of the system file partition 201 before alteration. By detecting the change in the value, it is possible to detect the presence/absence of the alteration shown in FIG. 4A.

An example of alteration of the system file partition 201 by installing (arranging) an invalid file in the system file partition 201 will be explained with reference to FIG. 4B. An invalid file 601 is an invalid file different from a normal system file. Arranging the invalid file 601 in the system file partition 201 decreases the unused area by an amount of the invalid file 601 with respect to the unused area before the invalid file 601 is arranged. That is, the unused area changes before and after the invalid file 601 is arranged. As described above, in this embodiment, not only the data of the system files but also the data stored in the unused area of the system file partition 201 are used to calculate a hash value. Thus, if the unused area is changed, the hash value is also changed. Therefore, by detecting the change in hash value, it is possible to detect the presence/absence of the alteration shown in FIG. 4B.

An example of alteration of the system file partition 201 by deleting a given system file in the system file partition 201 will be described with reference to FIG. 4C. Referring to FIG. 4C, the language file 308 is deleted from the system file partition 201. If the language file 308 is deleted from the system file partition 201, the unused area increases by an amount of the language file 308 with respect to the unused area before the deletion. That is, the unused area is changed before and after the deletion. As described above, in this embodiment, not only the data of the system files but also the data stored in the unused area of the system file partition 201 are used to calculate a hash value. Thus, if the unused area is changed, the hash value is also changed. Therefore, by detecting the change in hash value, it is possible to detect the presence/absence of the alteration shown in FIG. 4C.

Figure 4B:
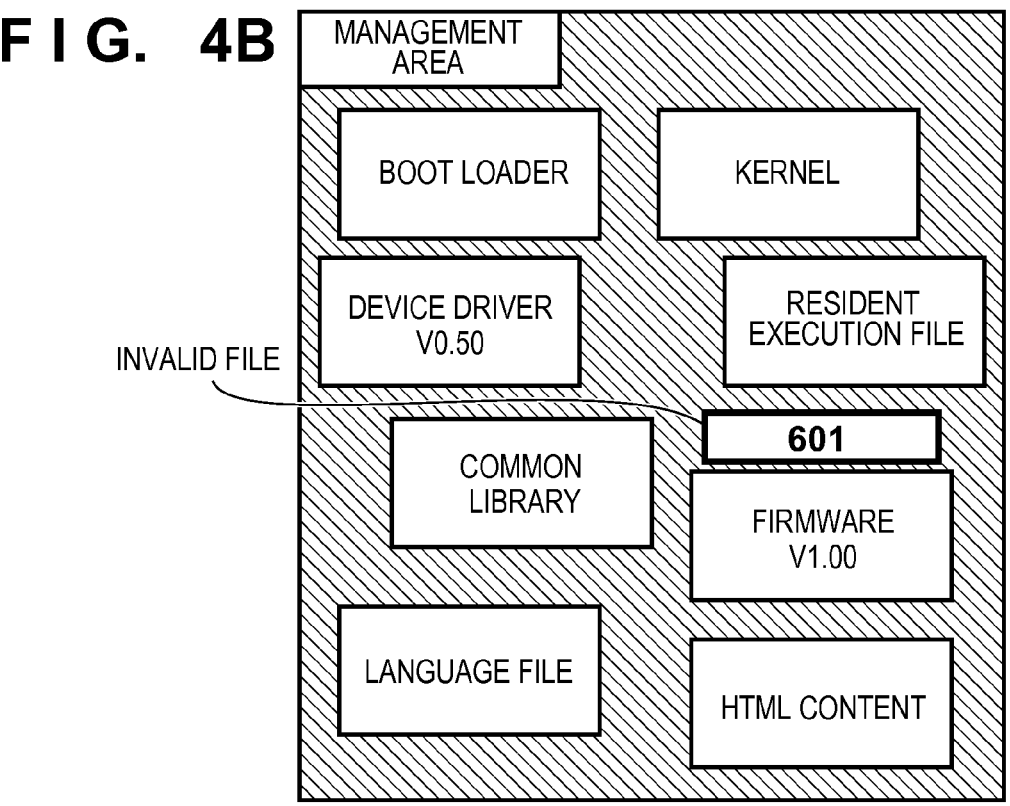
FIG. 4B is a view showing an example of alteration in the system file partition 201.
Figure 4C:
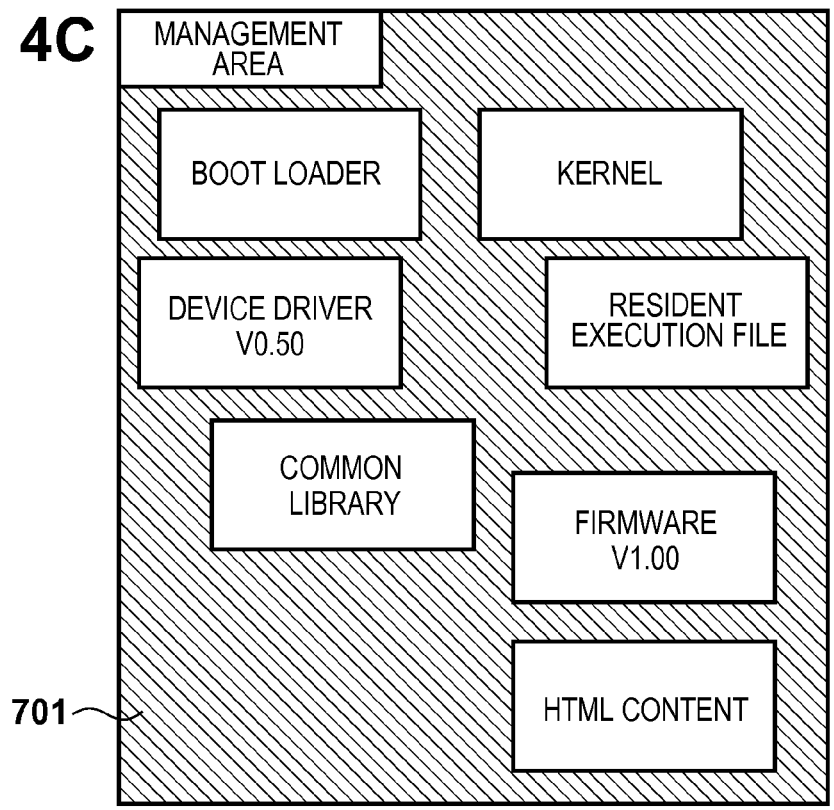
FIG. 4C is a view showing an example of alteration in the system file partition 201.

As described above, in this embodiment, a hash value is calculated for the system file partition 201 to detect the alteration exemplified in FIG. 4A, 4B, or 4C. In the conventional white list system, a hash value is calculated for each system file, and compared with verification data. In this case, since a hash value generated based on the contents of each system file is a unique value regardless of the arrangement of the system file in a partition, a hash value calculated by the manufacturer upon shipping is reliable.

If, however, a hash value is calculated for the entire system file partition as in this embodiment, the physical arrangement of the respective system files is not restricted, as described above. The arrangement of the system file partition may be different for each device (multi function peripheral 101). For example, as for a product of version 1.0 which is shipped from a factory and upgraded to version 1.1 by a shipping destination (user), and a product of version 1.1 shipped from the factory, even if the operations of the multi function peripherals 101 are completely the same, the physical arrangements of the system file partitions may be completely different from each other.

The manufacturer cannot calculate in advance a value common to all devices in a shipping stage as a hash value for the entire system file partition, and it is necessary calculate a hash value for each multi function peripheral 101. Therefore, a hash value is calculated when normally updating a system file.

Referring back to FIG. 6, in step S610, the CPU 105 encrypts the hash value calculated in step S609. In step S611, the CPU 105 stores the data (encrypted hash value data) of the hash value encrypted in step S610 in the setting data partition 202 (another memory area different from the system file partition 201).

The reason why the hash value is encrypted is because a hash value stored as a plain text may be rewritten by an illegal attack. Performing encryption can prevent the area from being illegally rewritten. Encryption may be omitted depending on a situation, as a matter of course.

Figure 7:
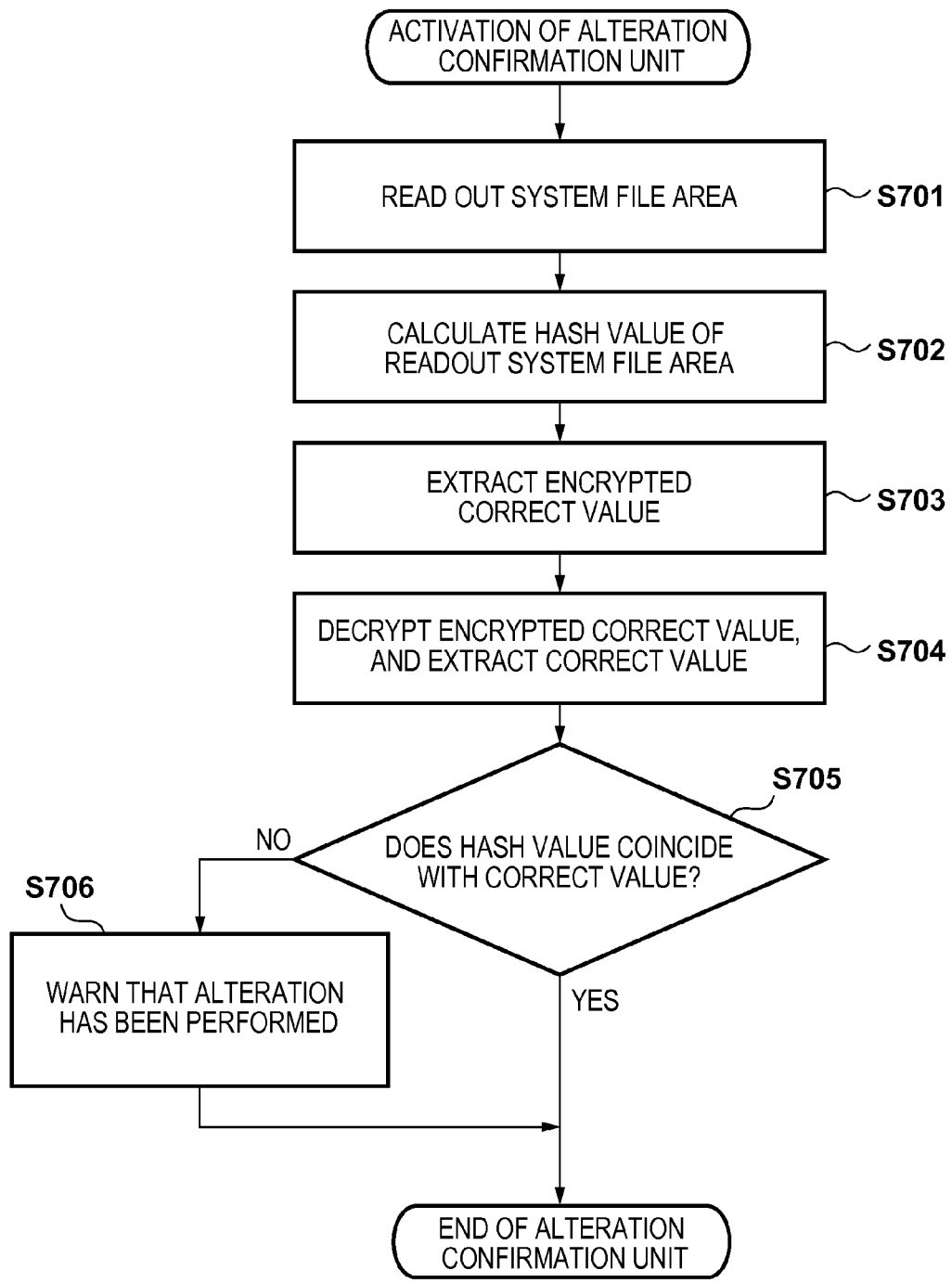
FIG. 7 is a flowchart illustrating processing executed by the multi function peripheral 101.

The processing of verifying the presence/absence of alteration in the system file partition 201 will be described with reference to FIG. 7 which is a flowchart illustrating the processing. Note that the processing according to the flowchart shown in FIG. 7 may be performed upon power-on of the multi function peripheral 101, or executed when the CPU 105 detects that the user inputs a verification processing start instruction by operating the UI operation unit 103. Alternatively, the CPU 105 may execute the processing according to the flowchart shown in FIG. 7 at a given time every week or every month by using the timer function of the CPU 105. That is, the execution timing of the processing according to the flowchart shown in FIG. 7 is not limited to a specific timing.

In step S701, the CPU 105 reads out all the data stored in the system file partition 201. In step S702, the CPU 105 calculates one hash value (the hash value of the data) using the data read out in step S701 according to the same hash calculation algorithm (the SHA-256 hash calculation algorithm in the above example) as that used in step S609.

In step S703, the CPU 105 reads out, from the setting data partition 202, the encrypted hash value data stored in the setting data partition 202 in step S611.

In step S704, the CPU 105 restores the hash value (correct value) calculated in step S609 by decrypting the encrypted hash value data read out in step S703.

In step S705, the CPU 105 compares the hash value calculated in step S702 with that restored in step S704, and determines whether the hash values coincide with each other. If it is determined that the hash values coincide with each other, it is determined that no alteration has been performed for the system file partition 201, thereby completing the processing according to the flowchart shown in FIG. 7. On the other hand, if it is determined that the hash values do not coincide with each other, it is determined that alteration has been performed for the system file partition 201, and the process advances to step S706.

In step S706, the CPU 105 executes processing for notifying that alteration has been performed for the system file partition 201. Various methods are possible as a notification method, and any notification method may be adopted in this embodiment. For example, the CPU 105 may control the network communication unit 102 to transmit, to the terminal apparatus of a specific user (for example, a system administrator), email in which information indicating that alteration has been performed is described. Alternatively, a message indicating that alteration has been performed may be displayed on the touch panel screen of the UI operation unit 103.

The processing speed for verifying the presence/absence of alteration will be explained. In the alteration presence/absence verification processing, the calculation time taken to load target system files and calculate a hash value degrades the operation performance of the multi function peripheral 101. The difference between the system of the present invention and the conventional white list system which has a hash value for each file will be described below.

Figure 8:
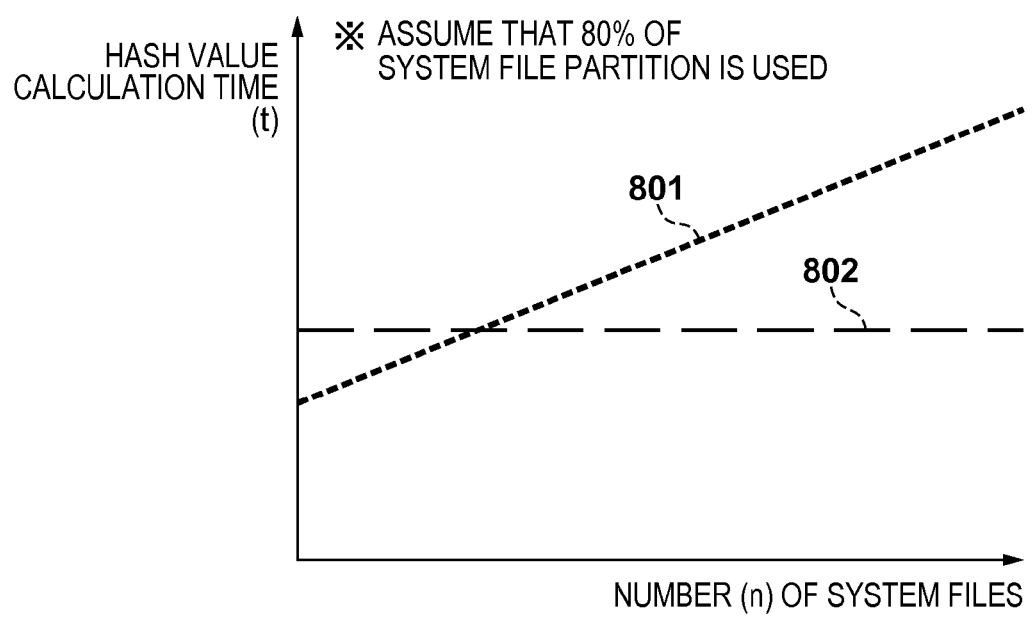
FIG. 8 shows graphs for explaining the performance tendencies according to a conventional system and a system of the present invention.

FIG. 8 shows graphs for explaining the performance tendencies according to the conventional system and the system of the present invention. The ordinate represents a hash calculation time (t), and the abscissa represents the number (n) of system files. Reference numeral 801 denotes a graph indicating the tendency of the calculation time according to the conventional system; and 802, a graph indicating the tendency of the calculation time according to the system of the present invention. Both the systems assume that 80% of the full capacity of the system file partition is used (that is, the remaining 20% of the full capacity indicates an unused area). The hash value calculation speed is represented by:

hash value calculation time=(file open overhead+file load time)+(hash value calculation overhead+ hash value calculation time for file)

In the example shown in FIG. 8, in the conventional system, only 80% of the system file partition is a calculation target, and thus the file load time and calculation time fall within a range of 80%. However, there are the file open overhead (corresponding to a magnetic head moving time and a cache miss hit) and the hash value calculation overhead (corresponding to initialization of a hash function and release of a reserved memory), and the total time increases as the number n of system files increases, thereby degrading the calculation performance. On the other hand, in the system of the present invention, since a hash value is calculated for the entire system file partition, the calculation time is constant regardless of the number of system files. Consequently, if the number of system files in the system file partition is large, the system of the present invention improves the performance, as compared with the conventional system.

As described above, according to this embodiment, it is only necessary to calculate in advance one hash value for the system file partition in order to verify the presence/absence of alteration of the system file partition. Furthermore, it is only necessary to manage a hash value of only about 32 bytes. Therefore, it is possible to suppress the capacity of the nonvolatile memory, and prevent the device cost from increasing.

If the number of software programs to undergo alteration verification and their sizes are sufficiently large, it is possible to prevent the load and hash value calculation overhead by calculating one hash value for all the software programs rather than each software program, thereby suppressing a decrease in operation performance.

Second Embodiment

To stabilize firmware being operated, processing (update processing) of reactivating a multi function peripheral 101 when a system file is downloaded to a setting data partition 202, and moving the system file to a system file partition 201 after the reactivation can be performed. If, however, the multi function peripheral 101 is falsely reactivated to illegally perform update, and a hash value after the update is calculated as a correct value and registered in the setting data partition 202, the invalid system file partition may be erroneously recognized as a correct one in subsequent alteration confirmation. This embodiment is obtained by improving the first embodiment in consideration of this problem. The difference from the first embodiment will be mainly described below. Details not mentioned below are the same as in the first embodiment.

Figure 9:
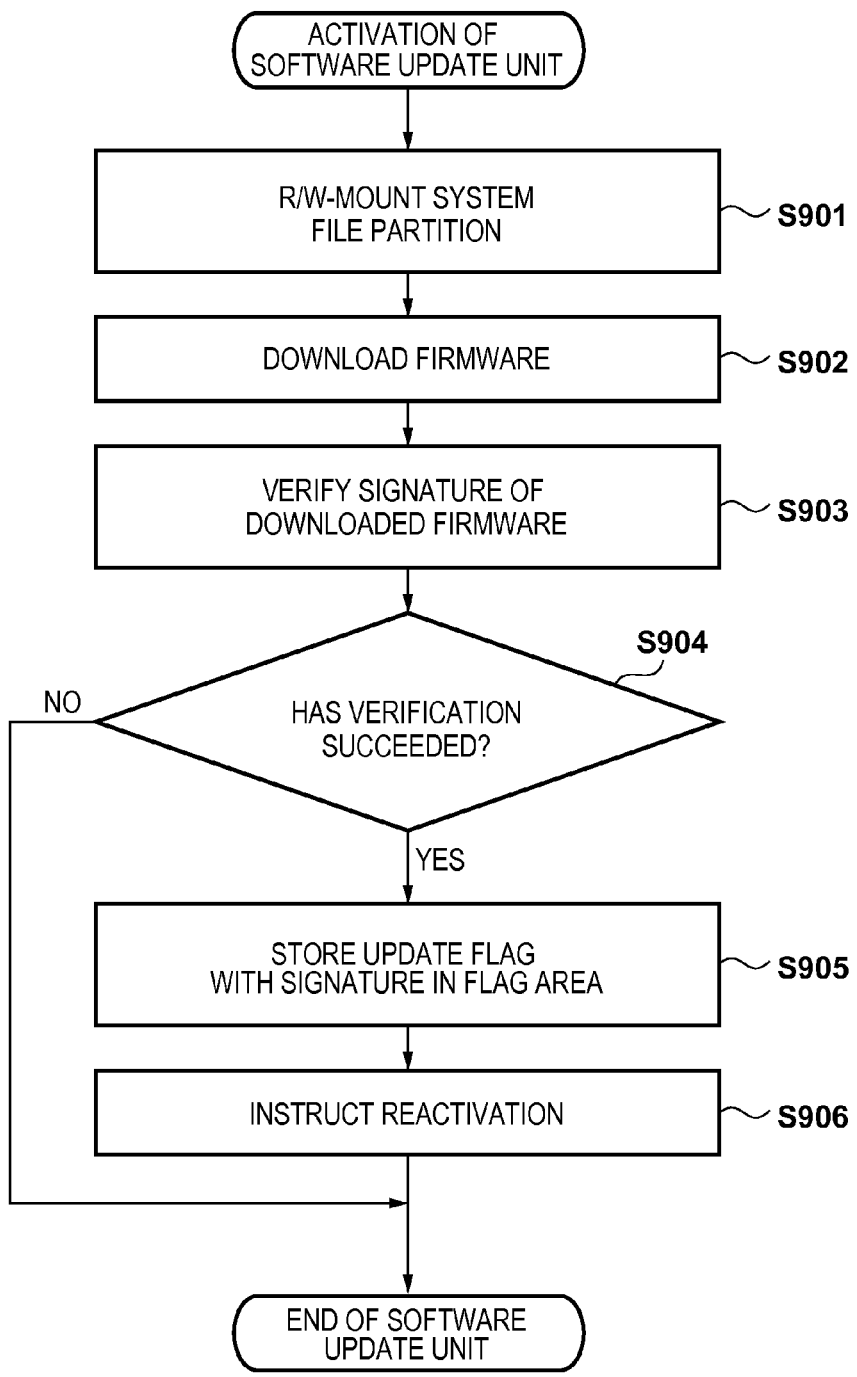
FIG. 9 is a flowchart illustrating processing executed by a multi function peripheral 101.
Figure 10:
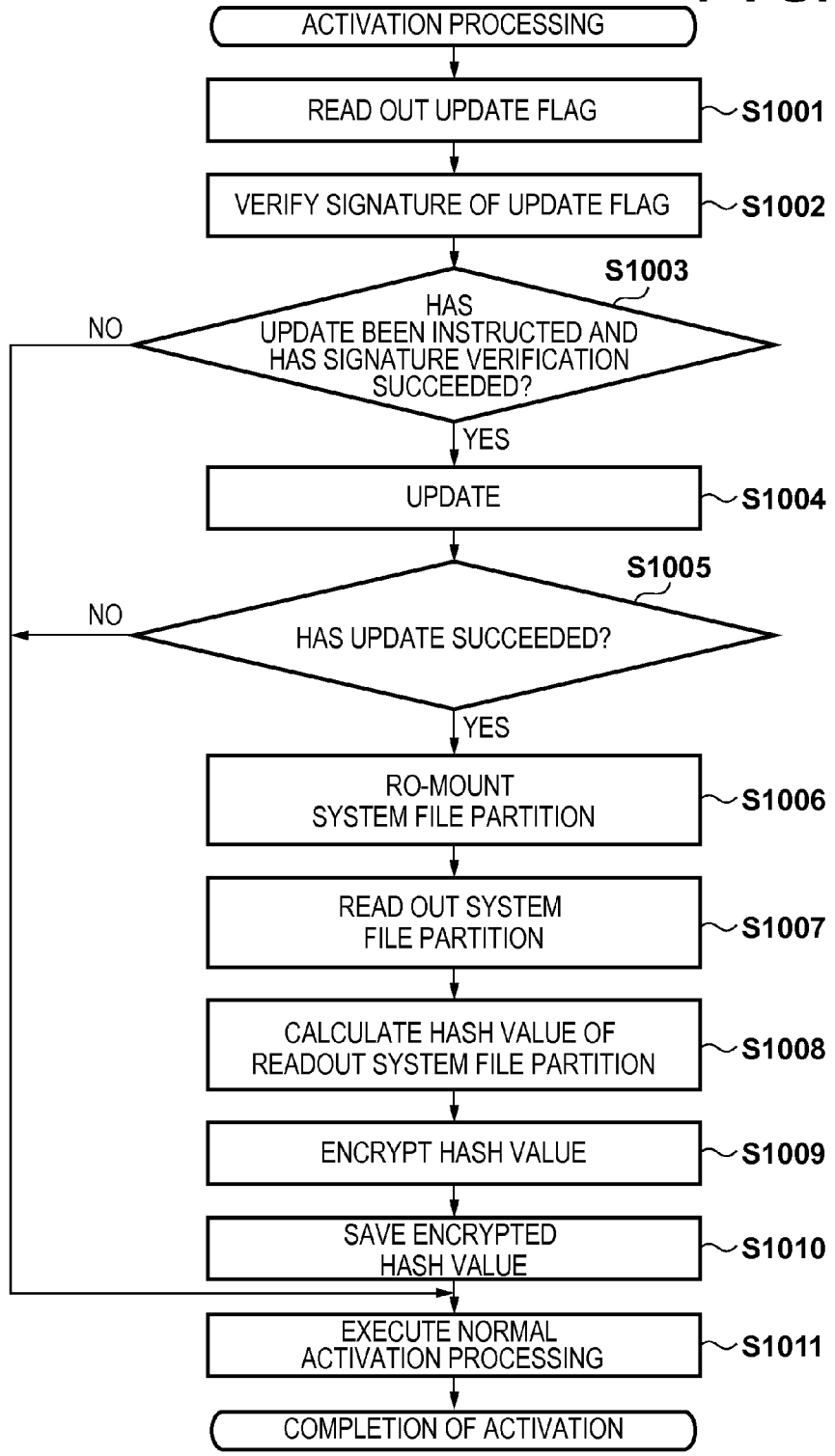
FIG. 10 is a flowchart illustrating processing executed by the multi function peripheral 101.

In this embodiment, as processing performed to generate data to be used for verifying the presence/absence of alteration in the system file partition 201, processes according to flowcharts shown in FIGS. 9 and 10 are executed instead of the processing according to the flowchart shown in FIG. 6.

In step S901, a CPU 105 R/W (Read/Write)-mounts the system file partition 201, similarly to step S601 described above.

In step S902, similarly to step S602 described above, the CPU 105 receives a system file (for example, firmware) transmitted from an external device (for example, a PC 125) via a network communication unit 102, and temporarily stores the received system file in the setting data partition 202 of a storage device 107.

In step S903, similarly to step S603 described above, the CPU 105 verifies the signature of the system file stored in the setting data partition 202 in step S902. If verification has succeeded, the process advances to step S905 via step S904; otherwise, the processing according to the flowchart shown in FIG. 9 is completed via step S904.

In step S905, the CPU 105 sets "1" in an update flag for instructing update processing during reactivation. The CPU 105 also signs the update flag using a private key, and writes the update flag in a flag area (not shown) of the setting data partition 202. Note that the initial value of the update flag is "0".

In step S906, the CPU 105 starts reactivation of the multi function peripheral 101. The CPU 105 executes the processing according to the flowchart shown in FIG. 10 during reactivation in step S906.

In step S1001, the CPU 105 reads out the update flag written in the setting data partition 202 in step S905. In step S1002, the CPU 105 verifies the signature of the update flag read out in step S1001 by using a certificate. If verification succeeds, the process advances to step S1004 via step S1003; otherwise, the process advances to step S1011 via step S1003.

In step S1004, similarly to step S605 described above, the CPU 105 updates the system file in the system file partition 201.

In step S1005, similarly to step S606 described above, the CPU 105 determines whether the update has succeeded in step S1004. If it is determined that the update has succeeded, the process advances to step S1006; otherwise, the process advances to step S1011.

In step S1006, similarly to step S607 described above, the CPU 105 RO (Read Only)-mounts (remounts) the system file partition 201.

In step S1007, similarly to step S608 described above, the CPU 105 reads out all data stored in the system file partition 201. In step S1008, similarly to step S609 described above, the CPU 105 calculates one hash value (the hash value of the data) using the data read out in step S1007.

In step S1009, similarly to step S610 described above, the CPU 105 encrypts the hash value calculated in step S1008. In step S1010, similarly to step S611 described above, the CPU 105 stores the data (encrypted hash value data) of the hash value encrypted in step S1009 in the setting data partition 202 (another memory area different from the system file partition 201). In step S1011, the CPU 105 executes normal activation processing.

As described above, according to this embodiment, since update is performed to calculate a correct value only when verification of the signature of a downloaded system file succeeds, it is possible to prevent invalid software from generating a wrong correct value.

Third Embodiment

As described with reference to FIG. 8, if the number of system files is sufficiently small, or the utilization factor of the system file partition is low, the arrangement according to the first embodiment may decrease the speed. Therefore, if there is a sufficient capacity in a storage device 107, and the conventional white list system is allowed, one of the conventional white list system and the system according to the first embodiment, whose speed is higher, may be selectively used.

As described with reference to FIG. 8, if alteration is confirmed for the entire system file partition, a time (confirmation time) Tp taken for confirmation is a fixed time since it depends on only the size of the system file partition, and is irrelevant to the number of stored system files and their sizes.

In this embodiment, an apparatus is initially activated by the conventional white list system, and an alteration confirmation time Tf of the conventional white list system is measured. If it is confirmed that the confirmation time Tf is larger than the confirmation time Tp, the conventional white list system is switched to the system which confirms alteration for the entire system file partition. This can suppress a decrease in performance caused by alteration confirmation as much as possible. Activation processing of a multi function peripheral 101 according to this embodiment will be described with reference to FIG. 11 which is a flowchart illustrating the processing.

In step S1101, a CPU 105 acquires an alteration confirmation mode stored in a setting data partition 202. The alteration confirmation mode is set to one of "a mode of confirming alteration for each file" (first mode) and "a mode of confirming alteration for a system file partition 201" (second mode). In the initial state, the alteration confirmation mode is set to the first mode.

In step S1102, the CPU 105 determines whether the alteration confirmation mode acquired in step S1101 is set to the first mode or the second mode. If it is determined that the alteration confirmation mode is set to the first mode, the process advances to step S1103. If the alteration confirmation mode is set to the second mode, the process advances to step S1111.

In step S1111, the CPU 105 performs the alteration presence/absence detection processing for the system file partition 201, which has been described in the first embodiment. If it is determined that alteration has been performed, the process advances to step S1106 via step S1112; otherwise, the process advances to step S1114.

In step S1106, similarly to step S706 described above, the CPU 105 notifies that alteration has been performed. On the other hand, in step S1114, the CPU 105 executes normal activation processing, similarly to step S1011 described above.

In step S1103, the CPU 105 acquires current time Tpre using its own timer function. In step S1104, the CPU 105 performs alteration presence/absence detection processing for each system file according to the conventional white list system.

If it is determined that alteration has been performed, the process advances to step S1113 via step S1105; otherwise, the process advances to step S1107 via step S1105. In step S1113, similarly to step S706 described above, the CPU 105 notifies that alteration has been performed.

In step S1107, the CPU 105 acquires current time Tpost using its own timer function. In step S1108, the CPU 105 obtains the time Tf taken for the alteration presence/absence detection processing for each system file, which has been performed according to the conventional white list system, by calculating Tf=(Tpost−Tpre).

In step S1109, the CPU 105 determines whether Tf>Tp. If Tf>Tp, the process advances to step S1110; otherwise, the process advances to step S1114. Since the time Tp is always constant, the manufacturer of the multi function peripheral 101 or the like predefines a constant as the time Tp, and registers it in the setting data partition 202. In step S1110, the CPU 105 switches the alteration confirmation mode to the second mode.

As described above, according to this embodiment, since one of the two alteration confirmation systems, which allows alteration confirmation to be performed at higher speed, is used, it is possible to suppress a decrease in speed caused by alteration confirmation.

Figure 11:
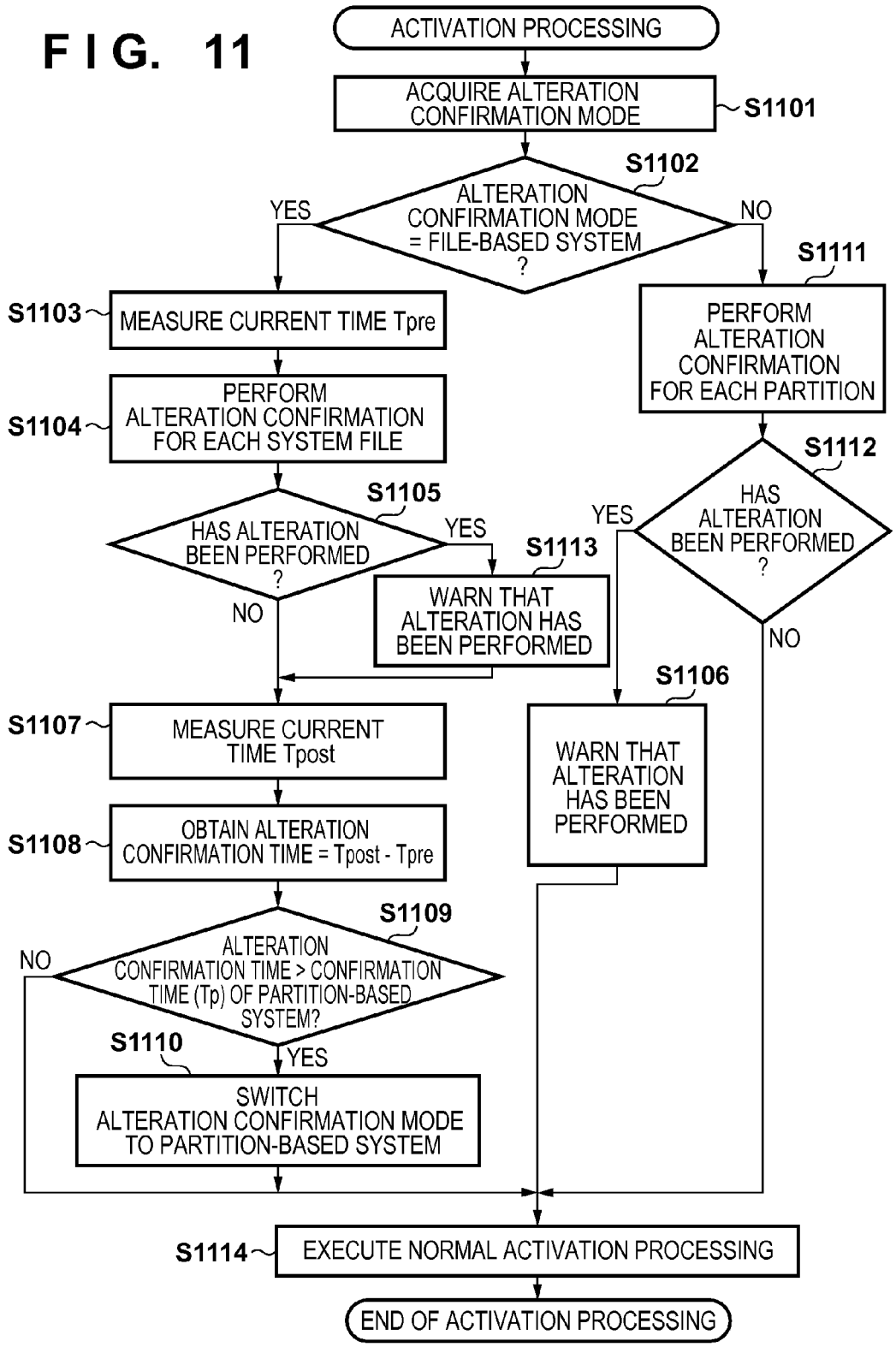
FIG. 11 is a flowchart illustrating processing executed by a multi function peripheral 101.

Note that the processing according to the flowchart shown in FIG. 11 has been explained as processing executed upon activation of the multi function peripheral 101. However, the execution timing of the processes in steps S1101 to S1113 may be another timing. For example, when the CPU 105 detects that the operator inputs an alteration presence/absence determination instruction by operating a UI operation unit 103, the processes in steps S1101 to S1113 may be executed. Alternatively, the processes in steps S1101 to S1113 may be executed at planned date/time set in advance.

Fourth Embodiment

In the first to third embodiments, "alteration presence/absence determination for the memory area holding the system files" in the multi function peripheral 101 has been described. The processes shown in FIGS. 6 and 7, however, are executable by any apparatus which has a memory area corresponding to the system file partition 201, and execution of the processes is meaningful. The processing (first processing) of calculating one hash value using all the data stored in the memory area for storing the system files, and registering the hash value in another memory area different from the memory area may be executed by an apparatus other than the multi function peripheral 101. Similarly, the processing (second processing) of calculating one hash value using the data stored in the memory area, determining whether the calculated hash value coincides with the hash value registered in the other memory area, and notifying, if it is determined that the hash values do not coincide with each other, that alteration has been performed for the memory area may be executed by an apparatus other than the multi function peripheral 101. Furthermore, the first processing and the second processing may be executed by the same apparatus or different apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-029967, filed Feb. 19, 2014, which is hereby incorporated by reference herein in its entirety.

What is claimed is:

1. An information processing apparatus comprising:
   (a) a storage unit having a system file partition used to store firmware of the information processing apparatus;
   (b) a setting unit configured to set one of a first mode of detecting alteration for the entire system file partition and a second mode of detecting alteration for the firmware stored in the system file partition;
   (c) a calculation unit configured to calculate a first hash value for the entire system file partition in a case where the setting unit sets the first mode, and to calculate a second hash value for the firmware stored in the system file partition in a case where the setting unit sets the second mode; and
   (d) an alteration detection unit configured to detect alteration of the entire system file partition based on the first hash value in a case where the setting unit sets the first mode, and to detect alteration of the firmware stored in the system file partition based on the second hash value in a case where the setting unit sets the second mode,
   wherein, in the first mode, the alteration detection unit calculates the first hash value for the entire system file partition, determines whether the calculated first hash value coincides with the first hash value, and notifies, in a case that it is determined that the calculated first hash value does not coincide with the first hash value, that alteration has been performed for the system file partition.

2. The information processing apparatus according to claim 1, wherein every time the firmware stored in the system file partition is updated, the calculation unit calculates the first hash value for the entire system file partition after the update.

3. The information processing apparatus according to claim 1, wherein in a case that verification of a signature of a file to be used to update the firmware succeeds, the calculation unit reactivates the information processing apparatus after acquiring the firmware, and calculates the first hash value for the entire system file partition.

4. The information processing apparatus according to claim 1, wherein the storage unit has a setting data partition, and
   wherein the information processing apparatus further comprises a registration unit configured to encrypt the first hash value calculated by the calculation unit, and to register the encrypted hash value in the setting data partition.

5. The information processing apparatus according to claim 1, wherein the setting unit initially sets the second mode, acquires a first time taken to detect alteration of the firmware stored in the system file partition, and sets the first mode in a case where the first time is longer than a second time depending on a size of the system file partition.

6. An information processing method for an information processing apparatus including a storage unit having a system file partition used to store firmware of the information processing apparatus, the information processing method comprising:
   setting one of a first mode of detecting alteration for the entire system file partition and a second mode of detecting alteration for the firmware stored in the system file partition;

calculating a first hash value for the entire system file partition in a case where the first mode is set, and calculating a second hash value for the firmware stored in the system file partition in a case where the second mode is set; and detecting alteration of the entire system file partition based on the first hash value in a case where the first mode is set, and detecting alteration of the firmware stored in the system file partition based on the second hash value in a case where the second mode is set, wherein, in the first mode, the detecting includes calculating the first hash value for the entire system file partition, determining whether the calculated first hash value coincides with the first hash value, and notifying, in a case that it is determined that the calculated first hash value does not coincide with the first hash value, that alteration has been performed for the system file partition.

7. A non-transitory computer-readable storage medium storing a computer program for causing a computer, which includes a storage unit having a system file partition used to store firmware of the computer, to function as units comprising:

a setting unit configured to set one of a first mode of detecting alteration for the entire system file partition and a second mode of detecting alteration for the firmware stored in the system file partition;

a calculation unit configured to calculate a first hash value for the entire system file partition in a case where the setting unit sets the first mode, and to calculate a second hash value for the firmware stored in the system file partition in a case where the setting unit sets the second mode; and an alteration detection unit configured to detect alteration of the entire system file partition based on the first hash value in a case where the setting unit sets the first mode, and to detect alteration of the firmware stored in the system file partition based on the second hash value in a case where the setting unit sets the second mode, wherein, in the first mode, the alteration detection unit calculates the first hash value for the entire system file partition, determines whether the calculated first hash value coincides with the first hash value, and notifies, in a case that it is determined that the calculated first hash value does not coincide with the first hash value, that alteration has been performed for the system file partition.

* * * * *